United States Patent
Nagata

(10) Patent No.: US 8,432,877 B2
(45) Date of Patent: Apr. 30, 2013

(54) ROUTING CONTROL METHOD AND SYSTEM

(75) Inventor: Nami Nagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 188 days.

(21) Appl. No.: 12/191,513

(22) Filed: Aug. 14, 2008

(65) Prior Publication Data

US 2009/0046729 A1 Feb. 19, 2009

(30) Foreign Application Priority Data

Aug. 17, 2007 (JP) ................................. 2007-213028

(51) Int. Cl.
| | |
|---|---|
| H04W 4/00 | (2009.01) |
| H04L 12/28 | (2006.01) |
| H04L 12/46 | (2006.01) |
| H04L 12/66 | (2006.01) |
| G06F 15/16 | (2006.01) |
| G06F 15/173 | (2006.01) |

(52) U.S. Cl.
USPC ...... 370/338; 370/349; 370/392; 370/395.52; 370/401; 370/409; 709/203; 709/238; 709/245; 709/249

(58) Field of Classification Search .............. 370/401, 370/338, 349, 392, 395.52, 409; 709/203, 709/238, 245, 249
See application file for complete search history.

(56) References Cited

U.S. PATENT DOCUMENTS

| | | | |
|---|---|---|---|
| 6,693,878 B1 * | 2/2004 | Daruwalla et al. ........... 370/235 |
| 7,036,143 B1 * | 4/2006 | Leung et al. ................. 726/15 |
| 7,068,640 B2 * | 6/2006 | Kakemizu et al. ........... 370/349 |
| 7,107,614 B1 * | 9/2006 | Boden et al. .................. 726/15 |
| 7,298,702 B1 * | 11/2007 | Jones et al. .................. 370/235 |
| 7,349,412 B1 * | 3/2008 | Jones et al. .................. 370/401 |
| 7,366,188 B2 * | 4/2008 | Kim ............................ 370/401 |
| 7,516,174 B1 * | 4/2009 | Tashjian et al. .............. 709/200 |
| 7,633,909 B1 * | 12/2009 | Jones et al. .................. 370/338 |
| 7,743,411 B2 * | 6/2010 | Ying et al. .................... 726/15 |
| 7,941,548 B2 * | 5/2011 | Tashjian et al. .............. 709/227 |
| 8,068,499 B2 * | 11/2011 | Vidya et al. ................ 370/395.5 |

(Continued)

FOREIGN PATENT DOCUMENTS

| | | |
|---|---|---|
| JP | 2004-80703 | 3/2004 |
| JP | 2005-223375 | 8/2005 |

OTHER PUBLICATIONS

Hideya Muramatsu, et al. "Proposal of shared multilink procedures on mobile IP," Journal of the 64th National Convention of IPSJ, No. 3 pp. 3-565-3-566, Mar. 2002.

*Primary Examiner* — Alpus H Hsu

(74) *Attorney, Agent, or Firm* — Greer, Burns & Crain, Ltd.

(57) ABSTRACT

A VPN server encapsulates a packet P2 upon receiving the packet and distributes packets P (2-1) and P (2-2) to wireless terminals MN1 and MN2 respectively. The wireless terminal MN1 decapsulates the packet P (2-1) (as packet P2-1) upon receiving the packet and transmits the packet P2-1 to a wireless terminal MN3. Thus, the packet is transmitted by a communication path: file server 102—VPN server 101—wireless terminal MN1—wireless terminal MN3. The wireless terminal MN2 decapsulates the packet P (2-2) (as P2-2) upon receiving the packet and transmits the packet P2-2 to the wireless terminal MN3. The packet P2-2 is transmitted by a communication path: file server 102—VPN server 101— wireless terminal MN2—wireless terminals MN3.

6 Claims, 17 Drawing Sheets

U.S. PATENT DOCUMENTS

| | | | |
|---|---|---|---|
| 8,077,689 B1* | 12/2011 | Jones et al. | 370/338 |
| 2002/0066036 A1* | 5/2002 | Makineni et al. | 713/201 |
| 2003/0021253 A1* | 1/2003 | Jung | 370/338 |
| 2003/0028650 A1* | 2/2003 | Chen et al. | 709/229 |
| 2003/0200321 A1* | 10/2003 | Chen et al. | 709/229 |
| 2005/0076142 A1* | 4/2005 | Chin | 709/245 |
| 2006/0080441 A1* | 4/2006 | Chen et al. | 709/225 |
| 2006/0185012 A1* | 8/2006 | Olivereau et al. | 726/14 |
| 2006/0236388 A1* | 10/2006 | Ying et al. | 726/15 |
| 2006/0253612 A1* | 11/2006 | Cheshire | 709/245 |
| 2007/0076724 A1* | 4/2007 | Hall et al. | 370/395.52 |
| 2007/0113275 A1* | 5/2007 | Khanna et al. | 726/15 |
| 2007/0271606 A1* | 11/2007 | Amann et al. | 726/15 |
| 2008/0037498 A1* | 2/2008 | Narayanan et al. | 370/342 |
| 2008/0089287 A1* | 4/2008 | Sagfors et al. | 370/331 |
| 2008/0101366 A1* | 5/2008 | Venkitaraman et al. | 370/392 |
| 2008/0201486 A1* | 8/2008 | Hsu et al. | 709/238 |
| 2008/0226053 A1* | 9/2008 | Takahashi | 379/208.01 |
| 2008/0263209 A1* | 10/2008 | Pisharody et al. | 709/227 |
| 2009/0129301 A1* | 5/2009 | Belimpasakis | 370/310 |
| 2010/0257226 A1* | 10/2010 | Niisato et al. | 709/203 |
| 2011/0138058 A1* | 6/2011 | Ishida | 709/227 |

* cited by examiner

FIG.2

| DESTINATION ADDRESS | NETMASK | GATEWAY | INTERFACE | METRIC |
|---|---|---|---|---|
| MN3 (LOCAL) | DEPEND ON ITEM ON LEFT COLUMN | MN1 (LOCAL) | MN1 (LOCAL) | MA |
| REMOTE NETWORK | DEPEND ON ITEM ON LEFT COLUMN | MN1 (REMOTE) | MN1 (REMOTE) | MB |
| LOCAL NETWORK | DEPEND ON ITEM ON LEFT COLUMN | MN1 (LOCAL) | MN1 (LOCAL) | MC |

FIG.3

| DESTINATION ADDRESS | NETMASK | GATEWAY | INTERFACE | METRIC |
|---|---|---|---|---|
| MN3 (LOCAL) | DEPEND ON ITEM ON LEFT COLUMN | MN2 (LOCAL) | MN2 (LOCAL) | MD |
| REMOTE NETWORK | DEPEND ON ITEM ON LEFT COLUMN | MN2 (REMOTE) | MN2 (REMOTE) | ME |
| LOCAL NETWORK | DEPEND ON ITEM ON LEFT COLUMN | MN2 (LOCAL) | MN2 (LOCAL) | MF |

ROUTING CONTROL METHOD AND SYSTEM

TECHNICAL FIELD

This application is related to packet routing control in which a plurality of communication paths are set by applying a VPN connection between a VPN server in a remote network and a plurality of terminal devices in a local network, and integrating the routes to a target terminal device.

BACKGROUND

Recently, opportunities to use various services and contents through an information device with a wireless interface (communication device) such as mobile phones have been increasing. However, the wireless network used for such opportunities intrinsically does not provide stable quality, and bandwidth of the wireless network is generally narrow compared with a wired communication network. Therefore, currently such communication cannot always operate seamlessly.

Technologies have been developed to virtually increase bandwidth by using a plurality of peripheral wireless devices. For example, a plurality of routes via a plurality of terminals connected to a network by using Mobile IPv4 can be bundled, and packets in each path distributed and aggregated at a Home Agent (HA), thereby virtually increasing bandwidth. However, this method has high packet header overhead because it requires Internet Protocol (IP) tunneling by Mobile IP up to the HA where packets are distributed and aggregated at the upper stream of the public network, and further requires additional IP tunneling to transfer the packets to other wireless terminals nearby.

More specifically, when the wireless terminal in a local network transmits a packet to a Correspondent Node (CN) in a remote network via the other wireless terminal, there is a problem of superimposing encapsulation; that is, performing encapsulation for IP tunneling of Mobile IP and further performing encapsulation for IP tunneling to transfer packets from one wireless terminal to the other wireless terminal. In this case, the conventional method results in increased overhead of packet header information due to IP tunneling.

In order to solve these problems, a method to distribute and integrate routes by a VPN (Virtual Private Network) server has been proposed. The basic operating principle is explained by using an example of downstream route integration (from the CN to a wireless terminal MN).

FIG. 14 shows a conventional integration of a plurality of routes. In FIG. 14, packets from the CN (e.g., a file server 102) to a wireless terminal MN2 are transmitted by using three routes (directly/via the wireless terminal MN1/via a wireless terminal MN3). The wireless terminals MN1, MN2, and MN3 have two communication interfaces (such as a wireless LAN and the Cell Phone Network).

The file server 102 and a VPN server 101 connect to a remote network RN, and the wireless terminals MN1, MN2, and MN3 can be connected to the VPN server 101 via the Cell Phone Network. The wireless terminals MN1, MN2 and MN3 are connected to the file server 102 by way of the VPN server 101. Moreover, the wireless terminals MN1, MN2 and MN3 are connected to the file server 102 by using VPN connection. And, wireless terminals MN1, MN2 and MN3 are connected by using Wireless LAN LN.

That is, the VPN addresses are used in the wireless LAN LN and the remote network RN, and the global addresses are used between the VPN server 101 and the wireless terminals MN1 and MN2 (in the Internet).

Next, the transmission of the packets 1400-1, 1400-2, and 1400-3 from file server 102 to Wireless terminal MN2 will be explained.

First, the file server 102 sends packets 1400-1, 1400-2, and 1400-3 to VPN server 101. At this time, the file server 101 sets the VPN address of the wireless terminal MN2 to the destination address (Dst) of each packet 1400-1, 1400-2, and 1400-3.

The VPN server 101 encapsulates the packets 1400-1, 1400-2, and 1400-3 received from the file server 101. (encapsulated packets 1400-1, 1400-2, and 1400-3 correspond to packets 1400-(1), 1400-(2), and 1400-(3)).

At this time, the VPN server 102 sets the global address of the wireless terminal MN1 to the destination address (DST) of packet 1400-(1). And, the VPN server 102 sets the global address of the wireless terminal MN2 to the destination address (Dst) of packets 1400-(2) and sets the VPN address of the wireless terminal MN3 to the destination address (Dst) of packets 1400-(3).

Next, the VPN server 101 sends the encapsulated packets 1400-(1), 1400-(2), and 1400-(3) via the wireless LAN LN. After that, the wireless terminal MN1, MN2, and MN3 decapsulate the packets 1400-(1), 1400-(2) and 1400-(3) respectively.

At this time, because the destination addresses (Dst) of the decapsulated packets 1400-1, 1400-2, 1400-3 are the VPN address of the wireless terminal MN2, the wireless terminals MN1 and MN3 send the packets 1400-1 and 1400-2 to the wireless terminal MN2 by using Wireless LAN LN.

FIG. 15 shows an exemplary network configuration in which connection is made from a laptop computer in a local area network (LAN) to a remote network by way of a wireless terminal serving as a gateway (GW). In FIG. 15, when connection to the file server 102 is made from the laptop computer via the wireless terminal MN, the wireless terminal MN can be regarded as the GW from the LAN which includes the laptop PC to the external network. Since a private address is used in a local network, a Network Address Translation (NAT) function is required.

FIGS. 16 and 17 show exemplary routing controls when integration of a plurality of routes are applied to the configuration shown in FIG. 15.

First, an example of upper stream control is shown in FIG. 16 (from a laptop computer to file server 102).

In FIG. 16, a wireless terminal MN3 (such as the laptop computer) requests data transfer to the file server 102. At this time, a destination address Dst of the packet P10 is the address of the file server 102, and a transmission source address Src is a local (private) address of the wireless terminal MN3.

When the packet P10 passes through the wireless terminal MN1, the transmission source address Src of the packet P10 is translated to the VPN address of the wireless terminal MN1 by NAT (Network Address Translation) and the packet P10 turns into a packet P20. At this time, the address translation rule is stored in the wireless terminal MN1. Then the packet P20 is encapsulated at the wireless terminal MN1.

After encapsulation the packet P20 (packet P(20)) is transmitted from the wireless terminal MN1 to the VPN server. The VPN server 101 decapsulates the packet P (20). After that, the VPN server 101 sends the packet P20 (decapsulated from the packet P (20)) to the file server 102.

Now an example of downstream control (from file server 102 to the wireless terminal MN3) shown in FIG. 17 will be explained.

In this explanation, a destination address Dst of a packet P30 transferred from the file server 102 is the VPN address of the wireless terminal MN1. The packets P30-1 and P30-2 are encapsulated at the VPN server 101 so that the address after encapsulation includes the global addresses of the wireless terminals MN1 and MN2, respectively. The encapsulated packets are assumed to be P (30-1), and P (30-2), respectively. The packets P (30-1) and P (30-2) are transferred from the VPN server to the wireless terminal MN1 and MN2, respectively.

When the packet P (30-1) arrives at the wireless terminal MN1, it is decapsulated by the wireless terminal MN1, and a packet P30-1 is obtained. The packet P (30-2) at the wireless terminal MN2 is also decapsulated. The decapsulated packet P30-2 is transferred to the wireless terminal MN1 according to a predetermined routing setting. The packets P30-1 and P30-2 addressed to the VPN address of the wireless terminal MN1 and received at the wireless terminal MN1 are transferred to the wireless terminal MN3 as a packet P40, after translating the transmission source addresses Src into the address of the wireless terminal MN3 according to a stored address translation rule table T1.

However, each of the packets P (30-1) and P (30-2) are transferred to the wireless terminal MN3 always by way of the wireless terminal MN1 in order to apply address translation according to the address translation rule table T1. Therefore, the load to the wireless terminal MN1 increases and may cause delay in each process in the wireless terminal MN1 and increase power consumption as well.

The typical technology uses the wireless LAN network for one more hop compared with transferring packets directly from the wireless terminal MN2 to the wireless terminal MN3. This redundant transfer may reduce end-to-end throughput if terminals using the same channel increase.

SUMMARY

According to an aspect of the present invention, a terminal device designated as a gateway among a plurality of terminal devices receives a VPN address assigned to a specific terminal device from the VPN server, and provides the VPN address to the specific terminal device.

The VPN server receives packets whose transmission source address is the VPN address and destination address is an IP address of a file server by way of the terminal device, and then transfers the packet to the file server.

After the file transfer, the VPN server receives packets whose transmission source address is an IP address of the file server and destination address is one or more VPN addresses.

Moreover, the VPN server encapsulates the packets by applying a header whose transmission source addresses respectively are the IP address of the VPN server and destination addresses respectively are the global address of the terminal device and at least one other terminal device that is not designated as a gateway among a plurality of terminal devices respectively.

Moreover, the VPN server transmits the encapsulated packets to the plurality of terminal devices in a local area according to global addresses which are destination addresses of headers of the packets.

The plurality of the terminal devices in the local area network decapsulate the distributed packets.

Then, these terminal devices transmit the packets to the plurality of terminal devices according to global addresses which are destination addresses of headers of the packets.

BRIEF DESCRIPTION OF THE DRAWINGS

FIG. 2 shows a routing table of a wireless terminal MN1;

FIG. 3 shows a routing table of a wireless terminal MN2;

DETAILED DESCRIPTION OF THE EMBODIMENTS

In this embodiment, the wireless terminal MN3 has only a local (private) address within the local network using wireless LAN. This is achieved by assigning the VPN address to the wireless terminal MN3 that belongs to the same subnet as those addresses assigned to the wireless terminals MN1 and MN2.

As a result, for upstream communication, packets that request data (the transmission source address is the VPN address of the wireless terminal MN3 and the destination address is the IP address of the file server) are transmitted from the wireless terminal MN3 to the file server via a communication path: the wireless terminal MN3—a gateway (the wireless terminal MN1)—the VPN server 101—the file server 102.

For downstream communication, the packets of the requested data (the transmission source address is the IP address of the file server and the destination address is the VPN address of the wireless terminal MN3) are distributed along the following communication paths and arrive at the wireless terminal MN3.

(1) A first communication path: the file server 102—the VPN server 101—the wireless terminal MN1—the wireless terminal MN3.

(2) A second communication path: the file server 102—the VPN server 101—wireless terminal MN2—the wireless terminal MN3.

This distributes the load of the wireless terminal MN1. A packet can be directly transferred from the wireless terminal MN2 to the wireless terminal MN3, thus reducing the use of a wireless LAN network for the amount of one hop compared with when transmitting a packet via the wireless terminal MN1.

According to this embodiment, the file server 102 is a server storing files and returning a response according to a routing control of this disclosure depending on a request from the wireless terminal MN3. Therefore, the file server 102 can function as a database server or a Web server. The file server 102 can be integrated with the VPN server 101 as well.

[Initial Settings of Routing Control]

Figure 1:
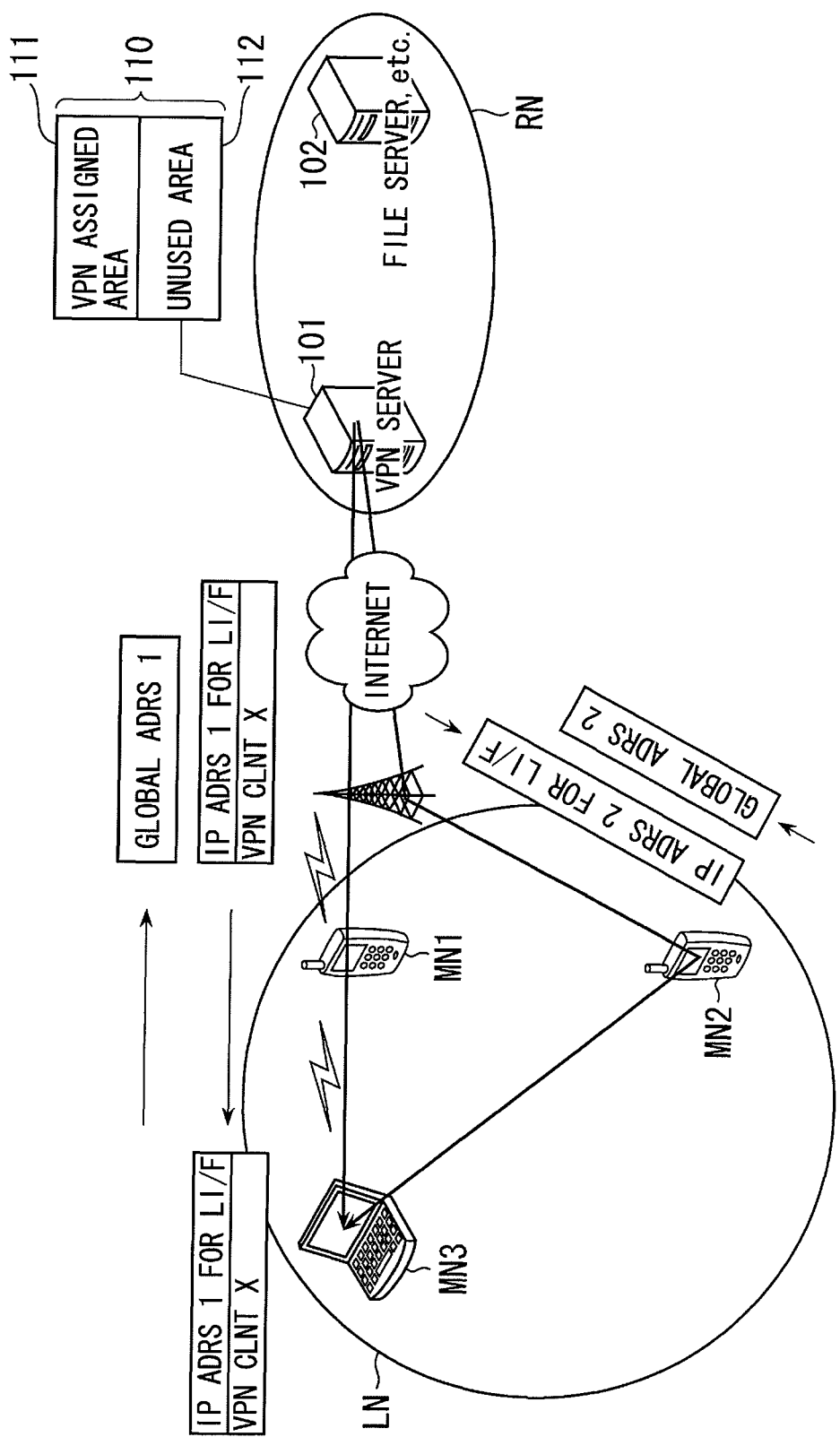
FIG. 1 shows initial settings of a routing control method according to an embodiment.

FIG. 1 is an explanatory diagram illustrating the initial settings of a routing control method according to the disclosure. In FIG. 1, wireless terminals MN1 and MN2 are terminal devices having two communication devices. One is a local interface and the other is an interface for an external network. The wireless terminal MN3 only has a local interface without an interface for an external network. The wireless terminal MN3 can communicate within a local network LN. In this embodiment, the wireless terminal MN1 is a gateway for the wireless terminal MN3.

A VPN connection is established between the wireless terminals MN1 and MN2 within the local network LN and the VPN server 101 within the remote network RN. Then, IP addresses in a VPN assigned area 111 among an IP address group 110 of VPN server 101 are distributed as VPN addresses to the wireless terminals MN1 and MN2 respectively.

The VPN server 101 assigns the following addresses from an unused area 112 of the IP address group 110 which the VPN server 101 manages; local interface IP address of the wireless terminal MN1 serving as a gateway (In FIG. 1, described as IP address 1 for LI/F), and a Local interface IP address of the wireless terminal MN2 (In FIG. 1, described as IP address 2 for LI/F), and a VPN address of the wireless terminal MN3 (In FIG. 1, described as VPN clnt X).

As mentioned above, managing the IP address group 110 by the VPN server 101 can avoid overlap of IP addresses; thereby the system of the embodiment can connect the VPN via the local network LN and the remote network RN.

The VPN server 101 distributes a local interface IP address of the wireless terminal MN1 and the VPN address of the wireless terminal MN3 to the MN1. The VPN server 101 distributes a local interface IP address to the wireless terminal MN2.

The wireless terminal MN1 transmits its global address (In FIG. 1, described as "global address 1") to the VPN server 101. Similarly, the wireless terminal MN2 transmits its global address to the VPN server 101 (In FIG. 1, described as "global address 2").

The wireless terminal MN1 transfers the VPN address of the wireless terminal MN3 and a local interface IP address (IP address 1 for LI/F) to the wireless terminal MN3 by selecting the local interface upon receiving the VPN address of the wireless terminal MN3 from the VPN server 1. Then, at the wireless terminal MN3, a default gateway of the wireless terminal MN3 is set to the local interface IP address assigned to the local interface of the wireless terminal MN1 (IP address 1 for LI/F).

This enables the wireless terminal MN3 to behave as if the wireless terminal MN3 can communicate within the same subnet as that of the wireless terminals MN1 and MN2, although the wireless terminal MN3 only has the local interface.

Routing tables of the wireless terminal MN1 and MN2 at this time will be explained. FIG. 2 shows the routing table of the wireless terminal MN1, whereas FIG. 3 shows the routing table of the wireless terminal MN2.

In FIGS. 2 and 3, "(Remote)" is an IP address assigned to external network interfaces of the wireless terminals MN1 and MN2, while "(Local)" is an IP address assigned to local interfaces of MN1 to MN3. As described above, the VPN address is assigned from the VPN assigned area 111 to an external interface of the wireless terminal MN1 as an interface for an external network of the wireless terminal MN1. Thus, MN1 (Remote) indicates a VPN address of the MN1.

The local address of the wireless terminal MN1 is originally assigned as the local interface of the MN1. Therefore, MN1 ("MN1 (Local)") indicates the local address of the wireless terminal MN1.

The local address of the wireless terminal MN3 is assigned to the local interface of the wireless terminal MN3, or nothing is assigned, and a VPN address is assigned from the VPN server 101. Therefore, "MN3 (Local)" indicates the assigned VPN address (VPN clnt X) of the wireless terminal MN3.

Routing Control Method

Next, a routing control method according to this embodiment will be explained.

Figure 4:
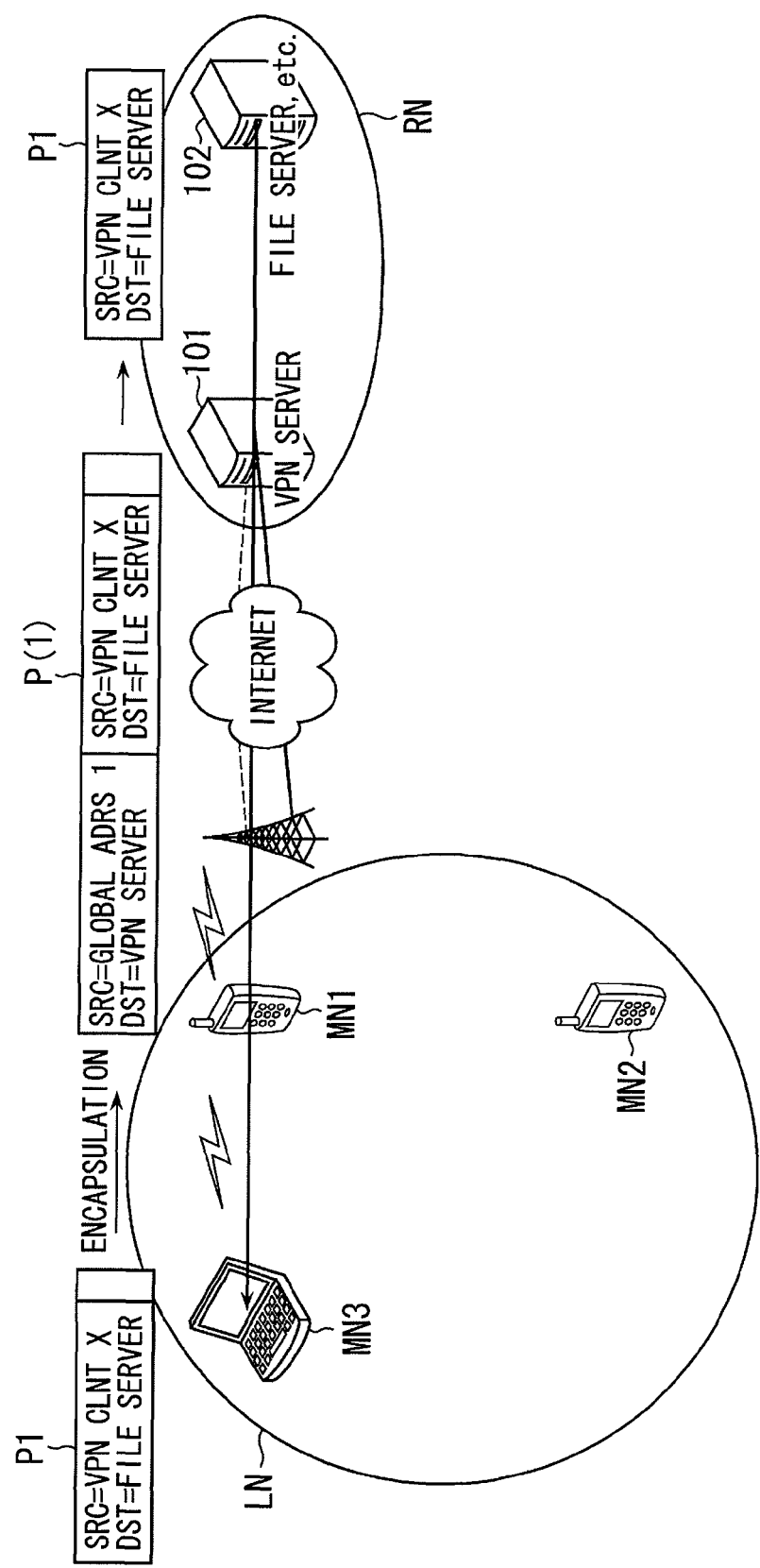
FIG. 4 shows a routing control method (upstream) according to the embodiment.
Figure 5:
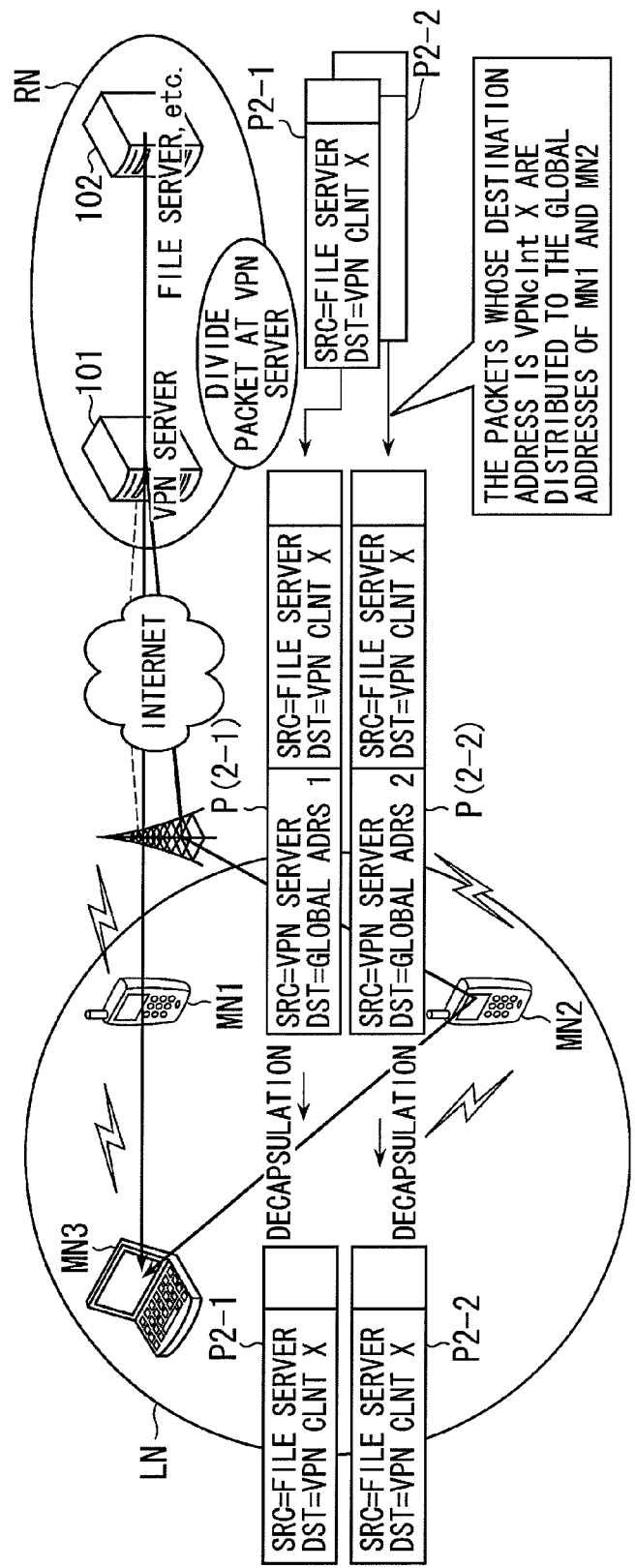
FIG. 5 shows a routing control method (downstream) according to the embodiment.

FIG. 4 shows an upstream routing control method. FIG. 5 shows a downstream routing control method. The upstream unit communication (or the routes) is from the wireless terminal MN3 to the file server 102, whereas the downstream unit communication (or integration of plurality of routes) is from the file server 102 to the wireless terminal MN3. The initial settings shown in FIGS. 1 to 3 are assumed to be completed before starting the upstream and the downstream communications.

First, FIG. 4 will be explained. The wireless terminal MN3 transmits a packet P1 to the wireless terminal MN1 serving as the gateway.

The packet P1 is a packet requested for data download from the file server 102. The packet P1 has the transmission source address Src that is a VPN address (VPN clnt X) assigned to the local interface of the wireless terminal MN3. Moreover, the packet P1 has the destination address Dst that is the IP address of the file server 102.

A default gateway of the wireless terminal MN3 is an IP address for a local interface assigned to the local interface of the wireless terminal MN1 (IP address 1 for LI/F). Therefore, the packet P1 is transmitted to the local interface of the wireless terminal MN1.

The wireless terminal MN 1 encapsulates the packet P1 upon receiving the packet P1. (Hereafter, the encapsulated packet P1 will be written as packet P(1)). The transmission source address Src of the packet P (1) is a global address of the wireless terminal MN1 (global address 1) whereas the destination address Dst is an IP address of the VPN server 101. A VPN connection is established between the wireless terminal MN1 and the VPN server 101, and thus the packet P (1) can be transmitted to the VPN server 101 by referring to routing information on the second line of the routing table shown in FIG. 2.

The VPN server 101 decapsulates the packet P(1) (as the packet P1) upon receiving the packet P(1). The packet P(1) is transferred to the file server 102 in a remote network designated as the destination. This completes the upstream communication.

Now, the downstream communication will be explained. The packet P2 transmitted from the file server 102 is a response to the packet P1 from the wireless terminal MN1, for example, a packet regarding to data requested by the packet P1.

In FIG. 5, the file server 102 transmits packets P2-1 and P2-2 to the VPN server 101. The packets P2-1 and P2-2 are packets whose transmission source address Src is the IP address of the file server 102 and destination address Dst is the VPN address assigned to the local interface of the wireless terminal MN3 (VPN clnt X). That is, in the packets P2-1, P2-2, the source and the destination of the packet P1 are replaced. For ARP request targeting the wireless terminal MN3 by the file server 102, the VPN server 101 makes a Proxy ARP response.

When the VPN server 101 receives the packets P2-1, P-2, the VPN server 101 judges whether or not the destination address Dst is the transmission source address Src of the packet P1, namely the VPN address assigned to the local interface of the wireless terminal MN3 (VPN clnt X).

When the judgment reveals that it is the VPN address (VPN clnt X), the VPN server 101 encapsulates P2-1, P2-2 by applying a header whose transmission source address Src is the IP address of the VPN server 101 (hereafter, the encapsulated packets P2-1, P2-2 will be written as packet P(2-1), P(2-2)). And, at the Packets P(2-1), P(2-2), the destination address Dst is the global address of the wireless terminals MN1 and MN2 respectively acquired at initial settings shown in FIG. 1. Thus, the packets P (2-1) and P (2-2) are distributed from the VPN server 101 to the wireless terminals MN1 and MN2.

Upon receiving the packet P (2-1), the wireless terminal MN1 decapsulates the packet from the VPN server 101. The destination address Dst of the decapsulated packet P(2-1) (P2-1) is the VPN address assigned to the local interface of the wireless terminal MN3 (VPN clnt X). Thus, the wireless terminal MN1 transmits the packet P2-1 to the wireless terminal MN3 by referring to the routing table of the wireless terminal MN1 and selecting the local interface. As a result, the packet P2-1 is transmitted by way of the first communication path.

Upon receiving the packet P (2-2), the wireless terminal MN2 decapsulates the packet. The destination address Dst of the decapsulated packet P(2-2) (packet P2-2) is the VPN address assigned to the local interface of the wireless terminal MN3 (VPN clnt X). Thus, the wireless terminal MN2 transmits the packet P2-2 to the wireless terminal MN3 by referring to the routing table of the wireless terminal MN2 and selecting the local interface. As a result, the packet P2-2 is transmitted by the second communication path.

[Functional Configuration of the Wireless Terminals MN1 and MN2]

Figure 6:
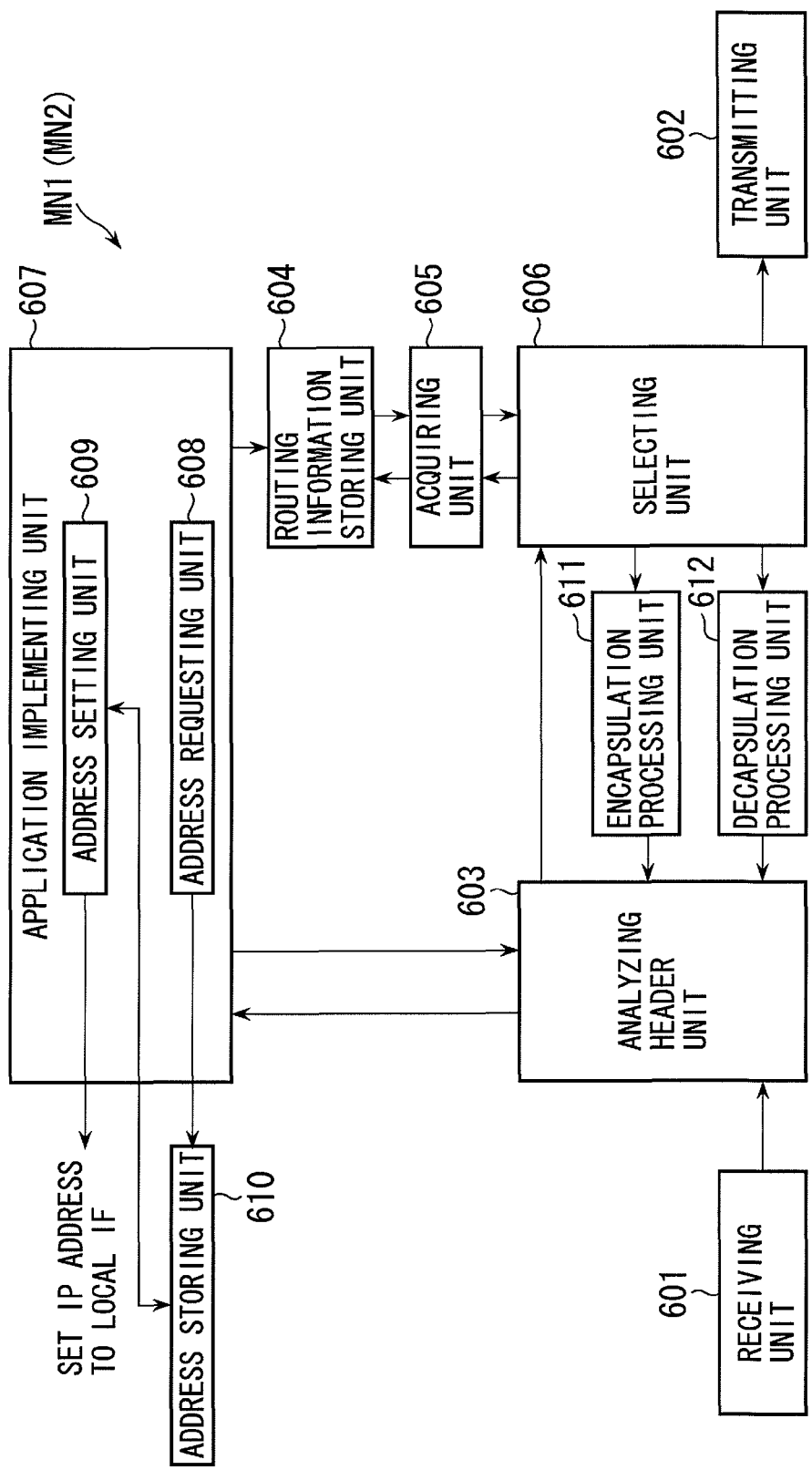
FIG. 6 shows a functional configuration of wireless terminals MN1 and MN2.

Now, a functional configuration of wireless terminals MN1 and MN2 will be explained. FIG. 6 is a block diagram illustrating a functional configuration of wireless terminals MN1 and MN2 according to the embodiment.

In FIG. 6, the wireless terminals MN1 and MN2 have a receiving unit 601, a transmitting unit 602, analyzing header unit 603, a routing information storing unit 604, an acquiring unit 605, a selecting unit 606, an application implementing unit 607, an encapsulation processing unit 611, and a decapsulation processing unit 612 respectively. Hereunder, for the purpose of the explanation, the wireless terminal MN1 is focused. However the same applies to the wireless terminal MN2, as well.

First, the receiving unit 601 receives packets from the outside, and the transmitting unit 602 transmits packets to the outside. More specifically, such functions are realized, for example, by an interface (a communication device) within the wireless terminal MN1. The interface can be selected from a local (wireless LAN) interface, and an interface for an external network (e.g., Cell Phone network).

The analyzing header unit 603 analyzes a header received by the receiving unit 601. More specifically, the analyzing header unit 603 identifies the transmission source address Src and the destination address Dst of the header.

The routing information storing unit 604 stores the routing tables such as those shown in FIGS. 2 and 3. The routing table is a memory table storing the routing information regarding a destination of a packet. The routing information storing unit 604 realizes the function by storage devices such as a memory or a hard disk within the wireless terminals MN1 or MN2.

The acquiring unit 605 reads the routing table from the routing information storing unit 604 in response to an instruction by the selecting unit 606. The read routing table is transmitted to the selecting unit 606. When transmitting a packet, the selecting unit 606 selects an interface by referring to the above routing table. More specifically, the gateway and the interface are selected depending on the destination address in the routing table.

The application implementing unit 607 sets a routing table by a routing protocol. For the wireless terminal MN1, the routing tables shown in FIG. 2, and for the wireless terminal MN2, that shown in FIG. 3 are set respectively. The routing table may be set statically or dynamically.

The application implementing unit 607 has an address requesting unit 608. When the terminal itself is designated as a gateway, the address requesting unit 608 requests from the VPN server 101 the local interface IP address of the terminal itself and the VPN address of the wireless terminal MN3.

The address requesting unit 608 makes the address storing unit 610 store the local interface IP address (in case of MN1, IP address 1 for LI/F) transmitted from the VPN server 101 in response to the request. The address setting unit 609 sets the local interface IP address (In case of MN1, IP address 1 for LI/F) stored in the address storing unit 610 as the local interface IP address.

When the address setting unit 609 receives the VPN address of the wireless terminal MN3 from the VPN server 101, the address setting unit 609 transfers the VPN address to the wireless terminal MN3. Thus, the local interface of the wireless terminal MN1 is selected and then with the local address of the wireless terminal MN3 as the destination, the VPN address is transmitted to the wireless terminal MN3. When the wireless terminal MN3 receives the VPN address, the wireless terminal MN3 rewrites the IP address identifying the local interface from the local address as the VPN address (VPN clnt X).

When the wireless terminal MN1 designated as a gateway transfers the VPN address of the wireless terminal MN3 to the MN3, the MN1 transmits the result to the wireless terminal MN2. Upon receipt, the MN2 requests the VPN server 101 through the address requesting unit 608 for the local interface IP address of the wireless terminal MN2 (LI/F IP address 2).

The encapsulation processing unit 611 encapsulates the received packet. More specifically, for example as shown in FIG. 4, the encapsulation processing unit 611 encapsulates the packet P1 (as a packet P(1)) by applying the header in which the transmission source address Src is the global address (Src=global address1) of the wireless terminal MN1, and the destination address Dst is the VPN server 101 (Dst=VPN server). Since the destination address Dst of the packet P (1) is the address of the VPN server 101, the packet P (1) is transmitted to the VPN server 101.

The decapsulation processing unit 612 decapsulates the received packet. More specifically, for example as shown in FIG. 5, in case of the wireless terminal MN1, the packet P (2-1) is decapsulated by removing the header in which the transmission source address Src is the address of the VPN server 101 (Src=VPN server), and the destination address Dst is the global address of the wireless terminal MN1 (Dst=global address 1).

The destination address Dst of the decapsulated packet P(2-1) (P2-1) is the VPN address of the wireless terminal MN3 (Dst=VPN clnt 1). This enables transmission of the packet P2-1 from the wireless terminal MN1 serving as a gateway to the wireless terminal MN3.

The analyzing header unit 603, the acquiring unit 605, the selecting unit 606, the application implementing unit 607, the encapsulation processing unit 611, and the decapsulation processing unit 612 all function by causing a CPU or LSI to execute programs stored in a storage device such as a memory or a hard disk of the wireless terminals MN1 and MN2.

[Functional Configuration of VPN Server 101]

Next, the functional configuration of the VPN server 101 according to an embodiment will be explained.

Figure 7:
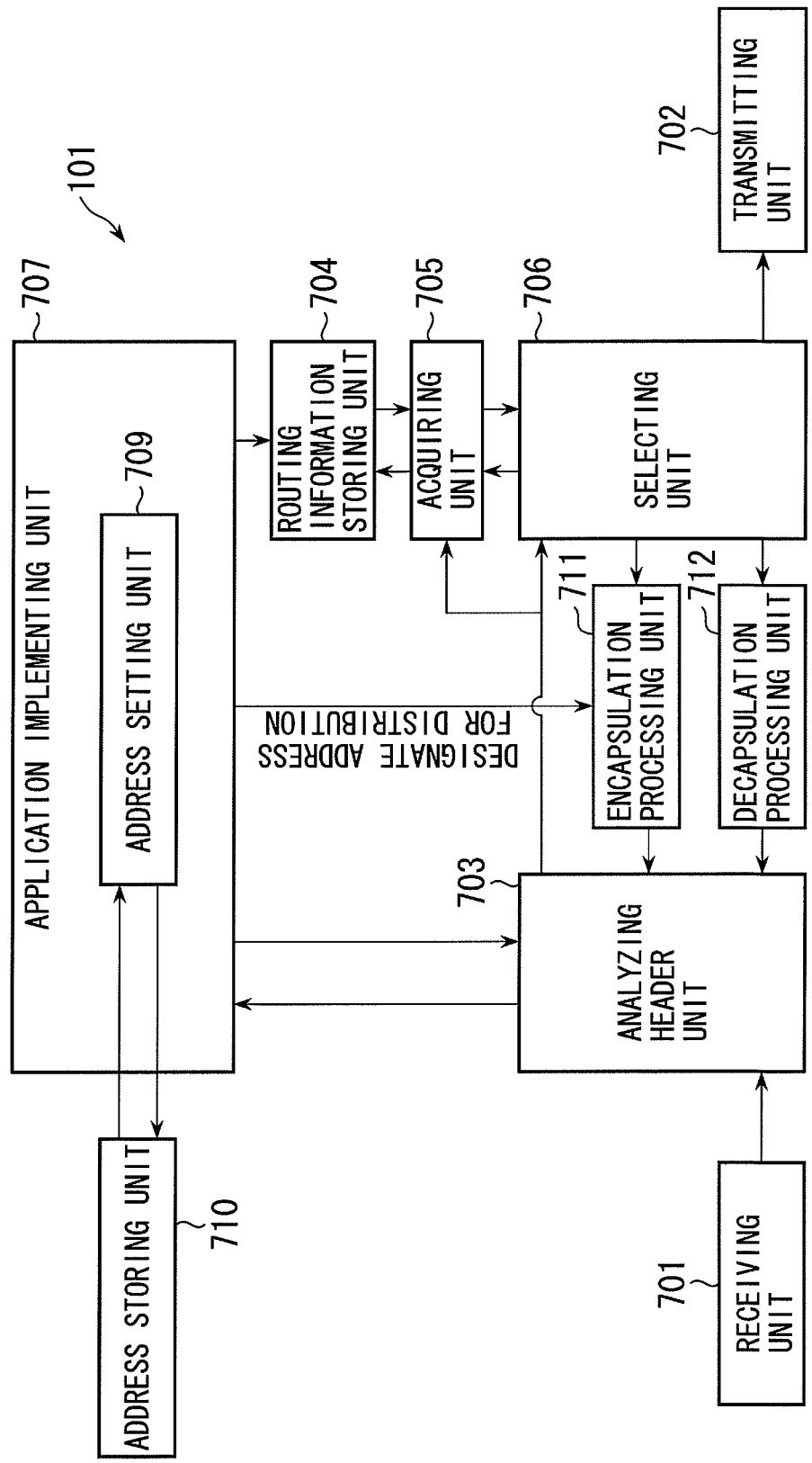
FIG. 7 shows a functional configuration of a VPN server according to the embodiment.

FIG. 7 shows a functional configuration of the VPN server 101. In FIG. 7, the VPN server 101 is a computer that provides a VPN connection between the remote network RN and the local network LN.

The VPN server 101 has a receiving unit 701, a transmitting unit 702, an analyzing header unit 703, a routing information storing unit 704, an acquiring unit 705, a selecting unit 706, an encapsulation processing unit 711, and a decapsulation processing unit 712.

First, the receiving unit 701 receives packets from the outside. The transmitting unit 702 transmits packets to the outside. More specifically, for example, this function is enabled by an interface within the VPN server 101. Such interface can be selected from a remote interface or an interface for an external network.

The analyzing header unit 703 analyzes a header received by the receiving unit 701. More specifically, the analyzing header unit 703 identifies the transmission source address Src and the destination address Dst of the header.

The routing information storing unit 704 stores the routing table, not shown in the figures. The routing table is a memory table storing the routing information regarding the destinations of packets. The routing information storing unit 704 performs the function by storage devices such as a memory or a hard disk within the wireless terminals MN1 or the MN2.

The acquiring unit 705 reads a routing table from the routing information storing unit 704 in response to an instruction by the selecting unit 706.

The read routing table is transmitted to the selecting unit 706. When transmitting a packet, the selecting unit 706 selects an interface by referring to the above routing table. More specifically, the destination and the interface are selected depending on the destination address in the routing table.

The application implementing unit 707 supplies the global addresses provided by the wireless terminals MN1 and MN2 (global address 1 and global address 2) to the encapsulation processing unit 711. Such addresses are used as a destination for the data taken from the file server 102 by a request from the wireless terminal MN3.

The application implementing unit 707 has an address setting unit 709. When the address setting unit 709 receives the address request shown in FIG. 6, and the request source is the wireless terminal MN1, then the application implementing unit 709 sets IP addresses in unused area 112 of IP address group 110 (i.e. an address storing unit 710) as the local interface IP address of the wireless terminal MN1 and the VPN address of the wireless terminal MN3. The address storing unit 710 performs the function by storage devices such as a memory or a hard disk within the VPN server 101.

When the request source is the wireless terminal MN2, the unit 709 sets an IP address in the unused area 112 of the IP address group 110 (i.e. an address storing unit 710) as the local interface IP address of the wireless terminal MN2. These set addresses are not overlapped with each other and are transmitted to the wireless terminals MN1 and MN2 respectively. When transmitting a packet, the selecting unit 706 selects a gateway and an interface.

The encapsulation processing unit 711 encapsulates packets received in the downstream process. The encapsulation processing unit 711 distributes packets P2-1, P2-1 transmitted from the file server 102 in time division by the provided global address, and encapsulates the distributed packets P2-1, P2-2 (as P(2-1), P(2-2)) respectively.

The encapsulation processing unit 711 encapsulates the packet P2-1 by applying a header in which the transmission source address Src is the address of the VPN server 101 (Src=VPN server), and the destination address Dst is the global address of the wireless terminal MN1 (Src=global address1). Since the destination address Dst of the encapsulated packet P(2-1) is the global address of the wireless terminal MN1 (Src=global address1), it is transmitted to the wireless terminal MN1.

Similarly, the packet P2-2 is encapsulated by applying a header in which the transmission source address Src is the address of the VPN server 101 (Src=VPN server), and the destination address Dst is the global address of the wireless terminal MN2 (Src=global address2). Since the destination address Dst of the encapsulated packet P(2-2) is the global address of the wireless terminal MN2 (Src=global address2), the packet is transmitted to the wireless terminal MN2.

The decapsulation processing unit 712 decapsulates a packet received in the upstream process. More specifically, for example, as shown in FIG. 4, the packet P (1) is decapsulated by removing the header in which the transmission source address Src is the global address of the wireless terminal MN1 (Src=global address1), and the destination address Dst is the VPN server 101 (Dst=VPN server). The decapsulated packet P(1) (as packet P1) is transferred to the file server 102 to which the packet P1 is addressed.

The analyzing header unit 703, the acquiring unit 705, the selecting unit 706, the application implementing unit 707, the encapsulation processing unit 711, and the decapsulation processing unit 712 all perform their functions by causing a CPU or LSI to execute programs stored in a storage device such as a memory or a hard disk of the VPN server 101.

[Processing Procedures of Initial Settings of the Wireless Terminals MN1 and MN2]

Figure 8:
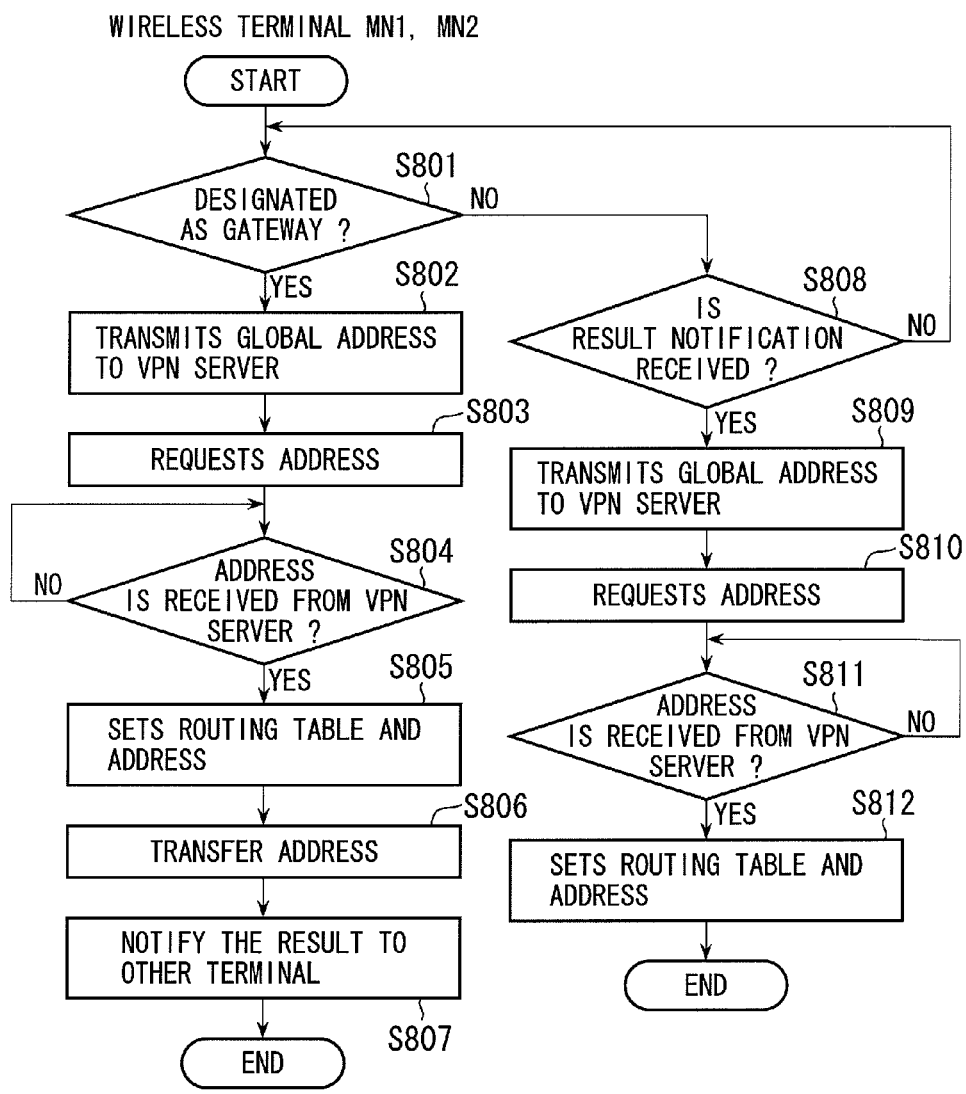
FIG. 8 show processing procedures of initial settings of wireless terminals MN1 and MN2 according to the embodiment.

Next, the processing procedures of the initial settings of the wireless terminals MN1 and MN2 will be explained. In FIG. 8, steps S801 to S807 show the processing procedures when the terminal itself becomes a gateway (the wireless terminal MN1), while steps S808 to S812 show the processing procedures when the terminal itself does not become a gateway (the wireless terminal MN2).

First, whether the terminal is designated as a gateway or not is judged (Step S801). This designation may be performed manually by a user or automatically by using the existing routing protocol. When the terminal is designated as a gateway (Step S801: Yes), the terminal transmits its own global address as an address of the wireless terminal MN1 to the VPN server 101 (Step S802), and then the address requesting unit 608 requests an address from the VPN server 101 (Step S803).

Then the terminal waits to receive the address from the VPN server 101 (Step S804: No). When the terminal receives the address (Step S804: Yes), then the routing table and address settings shown in FIG. 2 are set (Step S805).

Then the wireless terminal MN1 (the terminal serving as a gateway) transmits the VPN address of the wireless terminal MN3 and local interface IP address of wireless terminal MN1 (IP address 1 for LI/F) to the wireless terminal MN3 (Step S806). Then the wireless terminal MN1 transmits the result to the other wireless terminal (the wireless terminal MN2) in the same local network LN (Step S807).

When the terminal is not designated as a gateway at Step S801 (Step S801: No), whether or not the result shown in Step S807 is received is judged (Step S808). When it is not received, the flow returns to Step S801 (Step S808: No).

When the result is received (Step S808: Yes), the terminal transmits its own global address as an address of the wireless terminal MN2 to the VPN server 101 (Step S809).

Then the terminal MN1 requests an address through the address requesting unit 608 to the VPN server 101 (Step S810).

Then the terminal MN1 waits to receive the address from the VPN server 101 (Step S811: No). When the terminal receives the address (Step S811: Yes), the routing table and address settings shown in FIG. 3 are set (Step S812). This completes the series of processes of initial settings.

[Processing Procedures of Initial Settings of the VPN Server 101]

Figure 9:
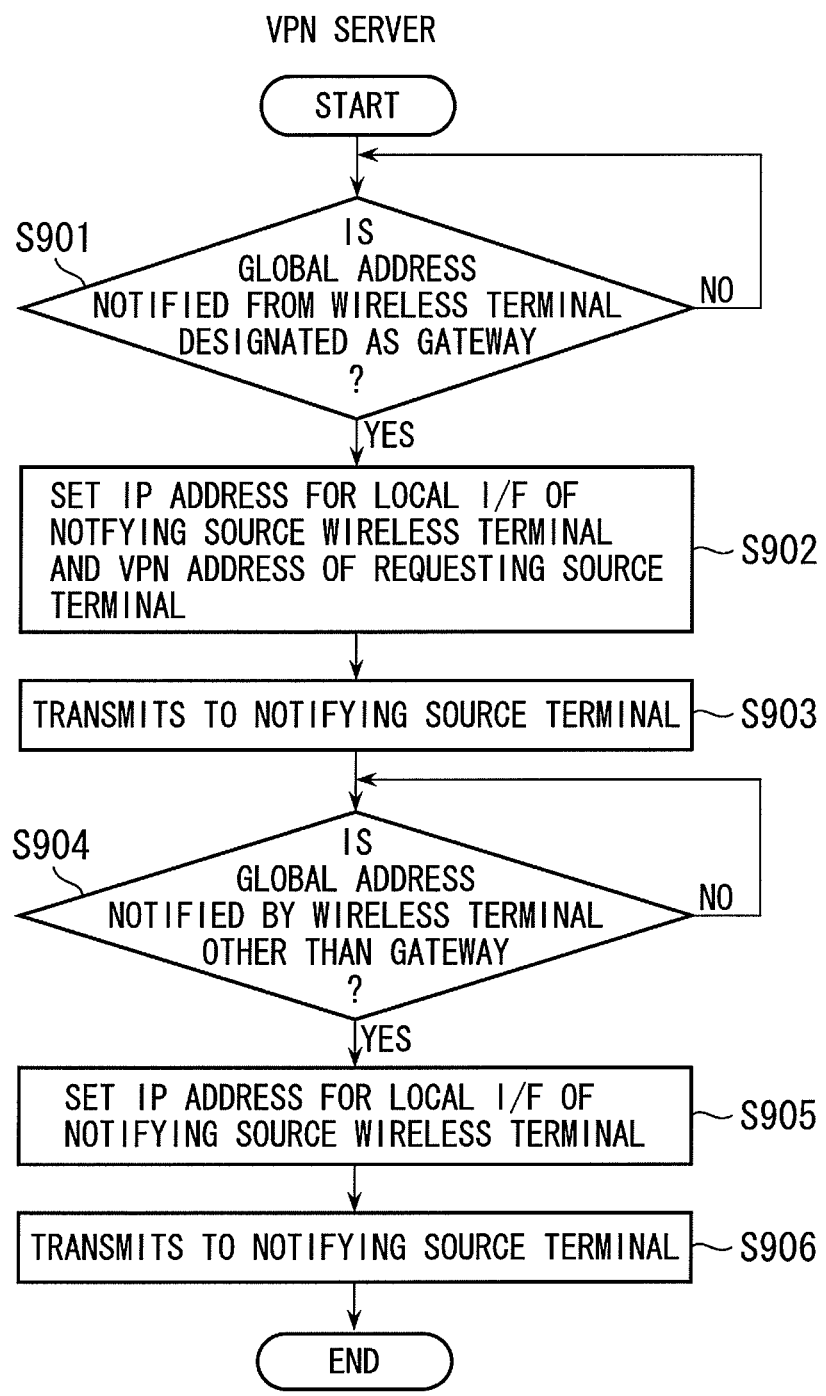
FIG. 9 shows processing procedures of initial settings of the VPN server according to the embodiment.

Next, processing procedures of the initial settings of the VPN server 101 will be explained. FIG. 9 shows the processing procedures of initial settings.

First, in FIG. 9, the VPN server 101 waits until a global address is provided from the wireless terminal MN1 designated as the gateway (Step S901: No). When the global address is provided (Step S901: Yes), the VPN server 101 sets the following addresses from the unused area 112 of the IP address group 110; the local interface IP address of the wireless terminal MN1 which is the providing source, and the VPN address of the wireless terminal MN3 which is the request source (Step S902). Then the VPN server 101 transmits the above set address to the wireless terminal MN1, which is the providing source (Step S903).

The VPN server 101 waits until the global address is provided from the wireless terminal MN2 other than one designated as a gateway (Step S904: No).

When the global address is provided from the wireless terminal MN2 (Step S904: Yes), the VPN server 101 sets the following addresses from the unused area 112 of IP address group 110; a local interface IP address of the wireless terminal MN1, which is the providing source (Step S905).

Then the VPN server 101 transmits the above set address to the wireless terminal MN1, which is the providing source (Step S906). This completes the series of processes of initial settings. As stated above, the initial settings of integration of a plurality of routes are completed by implementing the processing procedures shown in FIGS. 8 and 9, and the states shown in FIGS. 1 to 3 are obtained.

[Processing Procedures of Routing Control for the Wireless Terminals MN1 and MN2]

Figure 10:
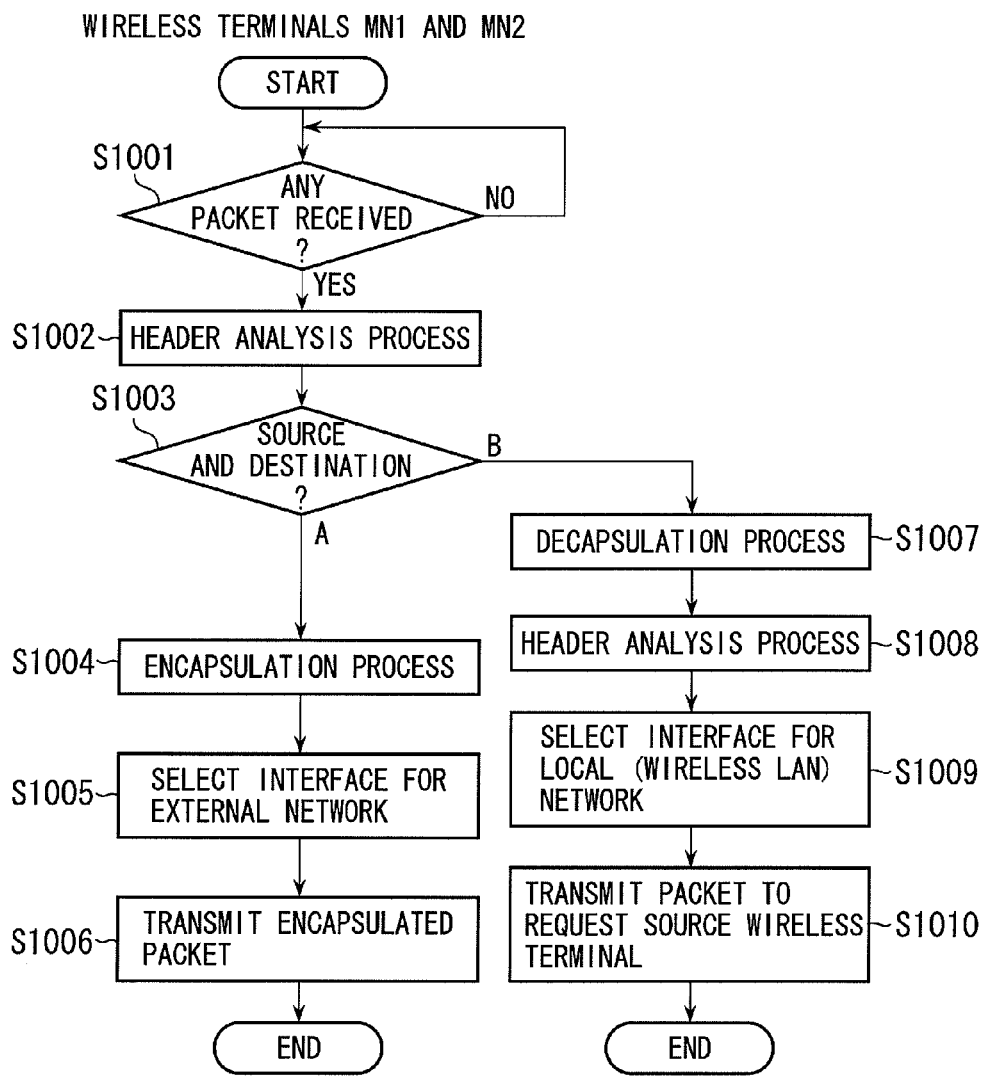
FIG. 10 is a flow chart showing processing procedures of routing control of the MN1 and the MN2 according to this embodiment.

Next, processing procedures of the wireless terminals MN1 and MN2 will be explained. FIG. 10 shows processing procedures of routing control for the wireless terminals MN1 and MN2. Steps S1001 to S1006 are processing procedures for upstream communication shown in FIG. 4 (applied only to the wireless terminal MN1), while Steps S1001, S1002, and S1007 to S1010 are processing procedures for downstream communication (applied to the wireless terminal MN1 and MN2).

Please note that for the purpose of the explanation, the following explanation focuses on the wireless terminal MN1. However, the same processing procedures are performed by the wireless terminal MN2 as well.

First, at the initial settings shown in FIGS. 1 and 10, the wireless terminals MN1 or MN2 wait until any packet is received (Step S1001). When the wireless terminal MN1 or the wireless terminal MN2 receives a packet (Step S1001: Yes), the header of the received packet is analyzed (Step S1002). When the transmission source address Src is a VPN address of the wireless terminal MN3 (VPN clnt X) and a destination address Dst is an IP address of a file server 102 (Step S1003: A), the packet is the packet P1 and is encapsulated to obtain the packet P (1) (Step S1004).

Then the wireless terminal MN1 selects an external network interface (Step S1005), and transmits the packet P (1) to the VPN server 101 (Step S1006), thereby completing the series of processes.

The packet received by the wireless terminal MN1 at Step S1003, whose transmission source address Src is the IP address of the VPN server, and whose destination address is Dst, includes the global addresses of MN1 and MN2 (Step S1003: B), then the wireless terminal MN1 decapsulates the packet P (2-1) and the packet P (2-2) (Step S1007) to obtain the packet P 2-1 and the packet P 2-2.

After that, the wireless terminal MN1 analyses the headers of the decapsulated packets P(2-1) and P(2-2) (as P2-1,-P2-2) (Step S1008). Since the destination address Dst is a VPN address of the wireless terminal MN3, the local interface is selected according to a routing table (Step S1009). Then the wireless terminal MN1 transmits the packet P2-1 from the wireless terminal MN1 and the packet P2-2 from the wireless terminal MN2 respectively to the wireless terminal MN3, which is the request source. The wireless terminal MN1 thereby completes the downstream process.

[Processing Procedures of Routing Control for VPN Server 101]

Figure 11:
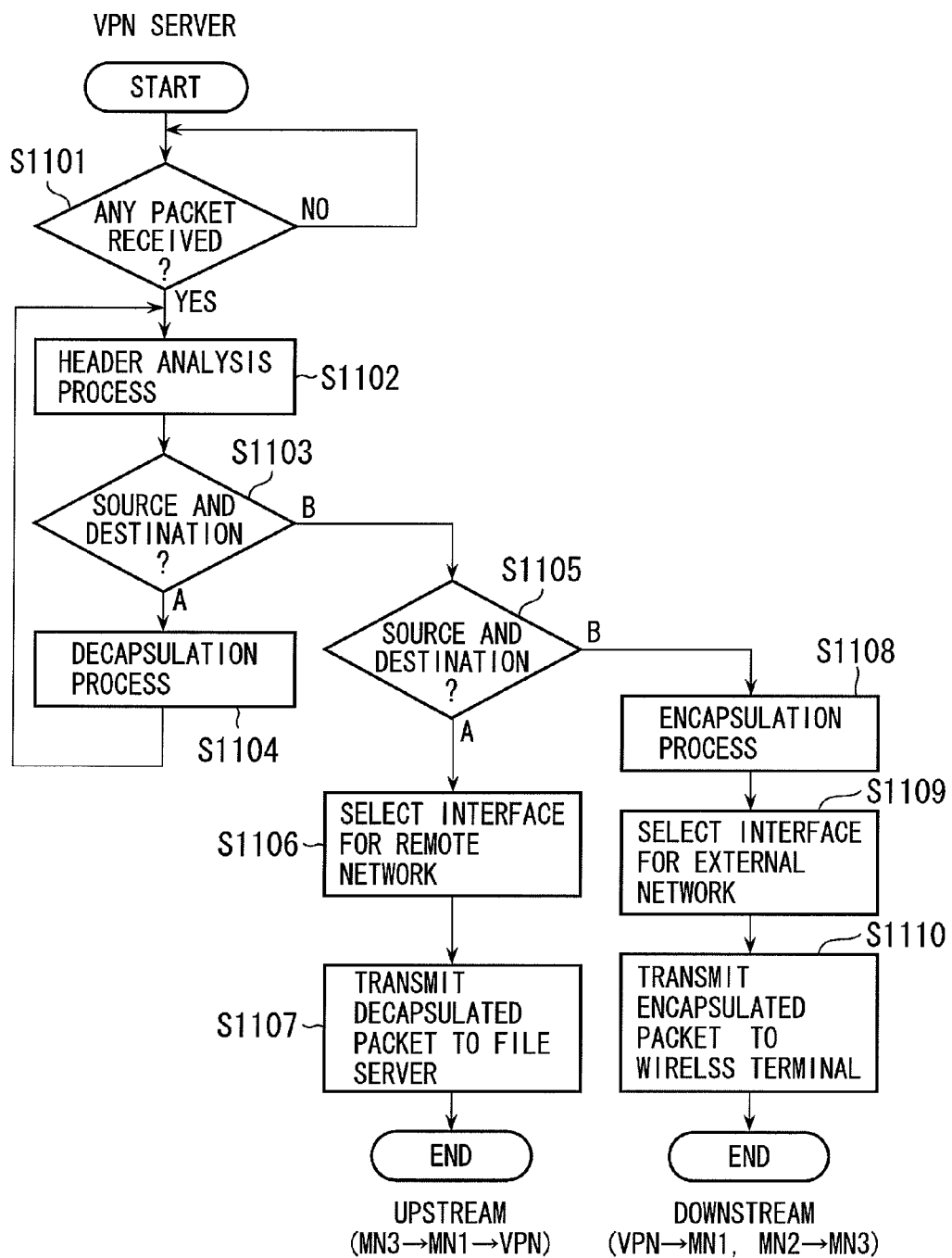
FIG. 11 is a flow chart showing processing procedures of routing control of the VPN server according to the embodiment.

Next, processing procedures of the VPN server 101 according to an embodiment will be explained. FIG. 11 shows processing procedures of routing control of the VPN server 101.

First, the VPN server 101 waits until any packet is received (Step S1101: No). When the VPN server 101 receives a packet (Step S1102: Yes), the server 101 analyses the header (Step S1102). When the transmission source address is a global address of the wireless terminal MN1 and a destination address is an IP address of the VPN server 101 (Step S1103: A), the flow returns to Step S1102 in order to analyze the header of decapsulated packet P1.

On the other hand, at Step S1103, the packet is assumed to be the packet P1 for the following cases: (a) the transmission source address is the global address of the wireless terminal MN1 and the destination address is not the IP address of the VPN server 101 (Step S1103: B), and (b) the transmission source address is the VPN address of the wireless terminal MN3 (VPN clnt X) and the destination address Dst is the IP address of the file server 102 (Step S1105: A).

Then, the VPN server 101 transmits the packet P1 decapsulated at Step S1104 to the file server 102 (Step S1107) by selecting an interface to the remote network (Step S1106).

At step S1105, the packet received at Step S1101 is assumed to be the packet P2 from the file server 102 when the transmission source address is the IP address of the file server 102, and the destination address is the VPN address of the wireless terminal MN3 (VPN clnt X) (Step S1105: B). Then the packet P2 is encapsulated (Step S1108) and the external network interface is selected (Step S1109).

Then the VPN server 101 transmits the packets P (2-1) and P (2-2) to the wireless terminals MN1 and MN2 respectively (Step S1110). As stated above, packet routing control for integrating a plurality of routes shown in FIGS. 4 and 5 is completed by implementing the processing procedures shown in FIG. 10 and FIG. 11.

A DHCP (Dynamic Host Configuration Protocol) installed in the wireless terminal MN3 may be used when setting an IP address and a default gateway of the wireless terminal MN3 at the above wireless terminals MN1 and MN2.

In this case, adding functions equivalent to those of a DHCP server to the wireless terminals MN1 and MN2 can make the wireless terminal MN1 designated as a gateway behave as if the MN1 is a DHCP server.

Figure 12:
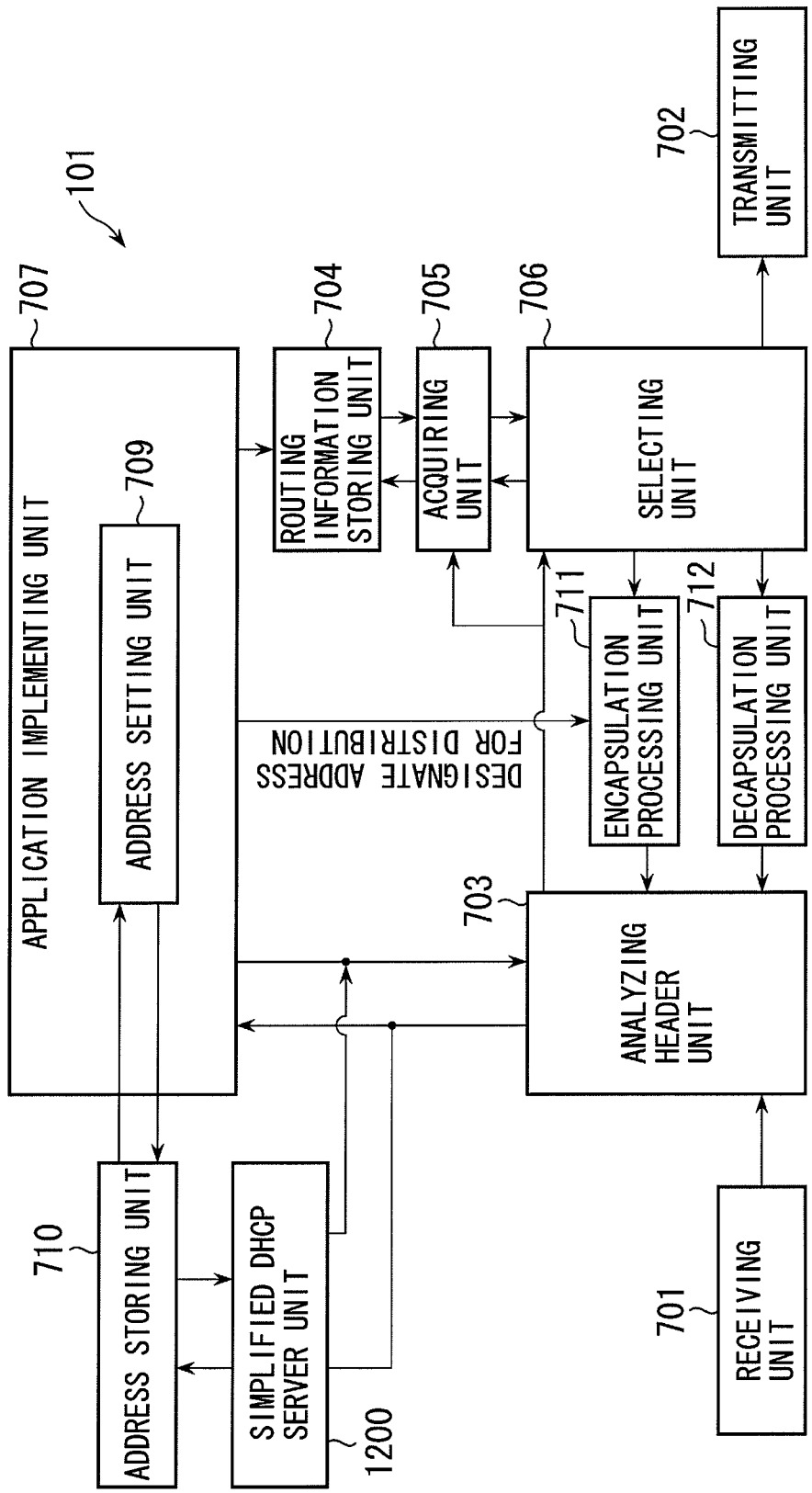
FIG. 12 shows a functional configuration 2 of wireless terminals MN1 and MN2 according to the embodiment.

FIG. 12 shows a functional configuration 2 of the wireless terminals MN1 and MN2.

When the functions are the same as those shown in FIG. 6, the same reference numerals as those in FIG. 6 are assigned to functions in FIG. 12 as well, and explanations for these functions are omitted here. In FIG. 12, the wireless terminals MN1 and MN2 provide a simplified DHCP server unit 1200. The simplified DHCP server unit 1200 automatically sets a VPN address and a default gateway of the wireless terminal MN3. This function is explained using FIG. 13.

Figure 13:
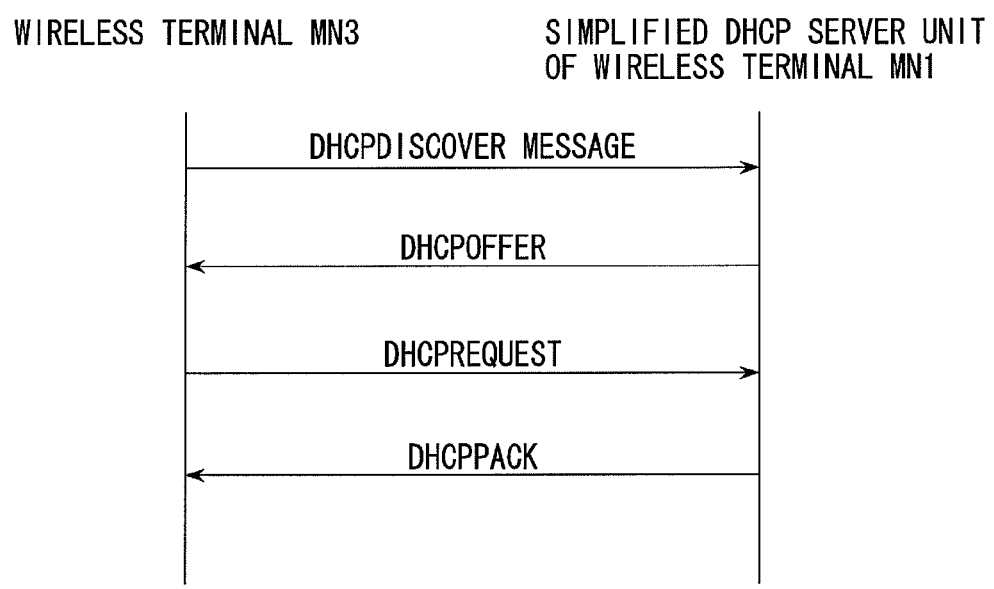
FIG. 13 is a sequence diagram between the wireless terminal MN3 and the wireless terminal MN1 serving as a default gateway.
Figure 14:
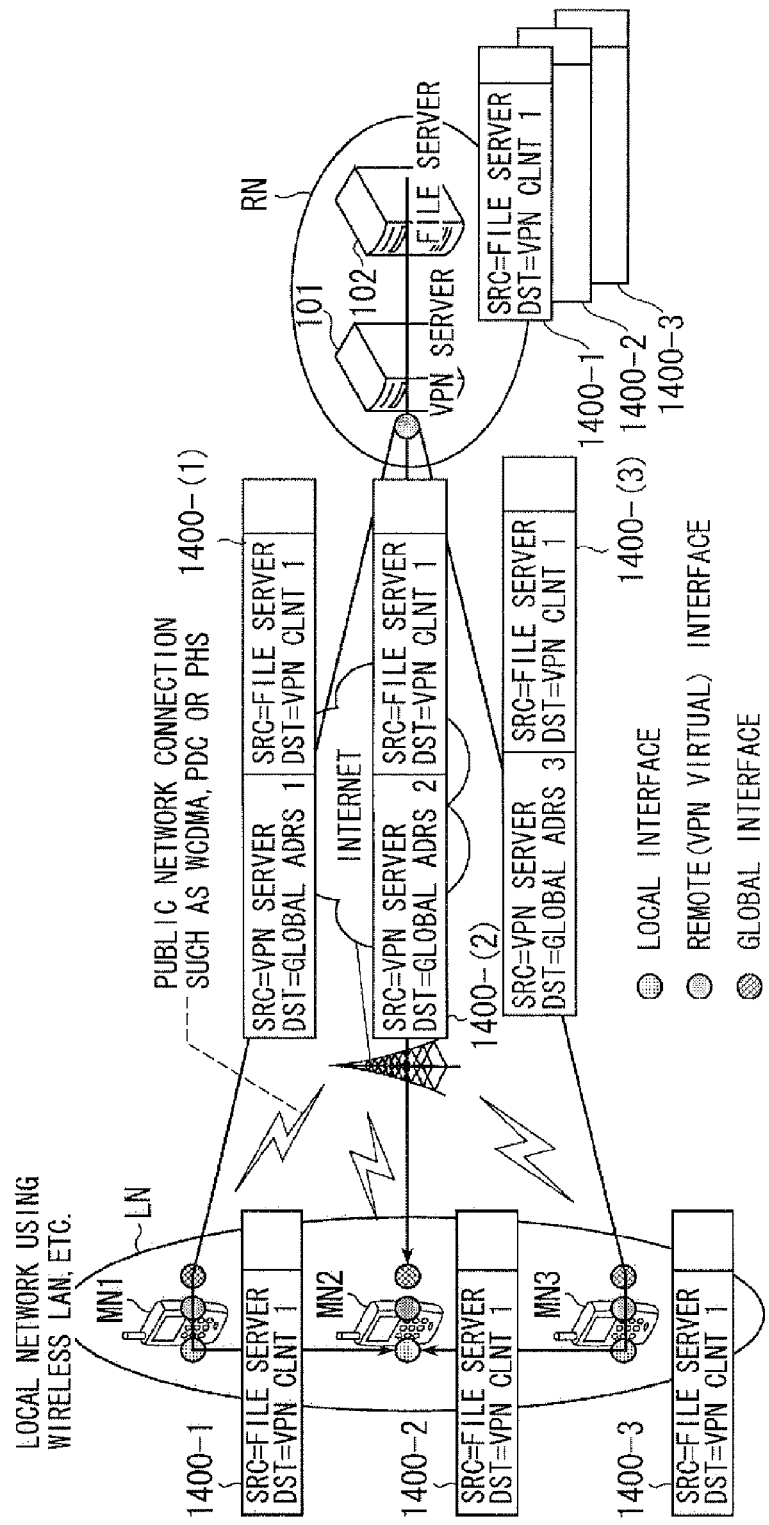
FIG. 14 shows an exemplary conventional configuration for integrating a plurality of routes.
Figure 15:
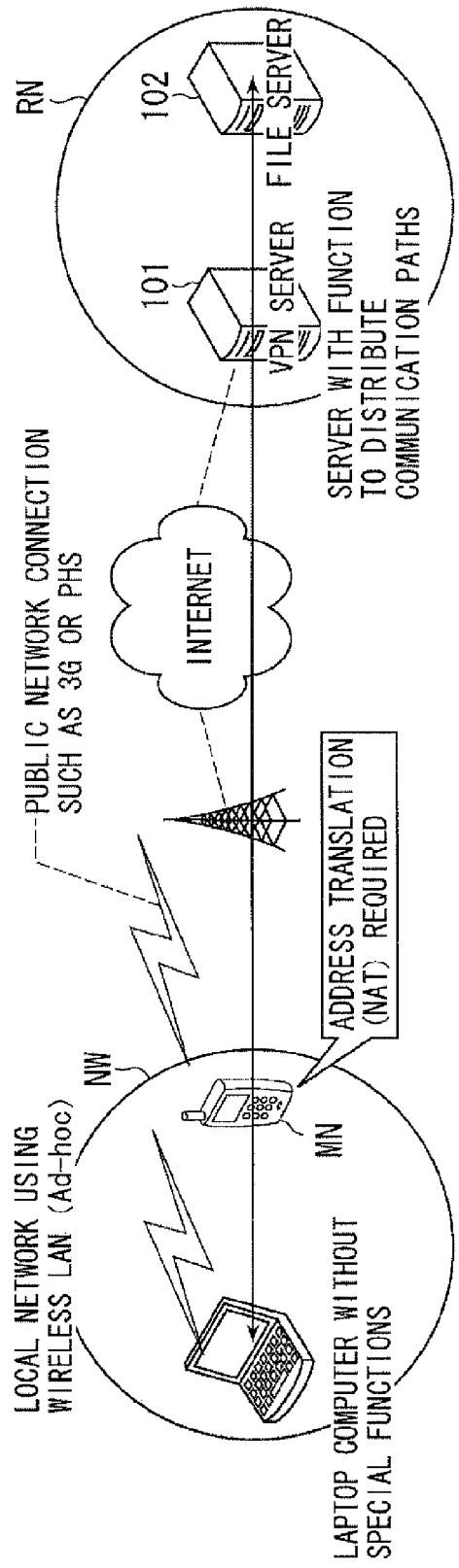
FIG. 15 shows an exemplary network configuration in which connection is made from a laptop computer in a local area network to a remote network via a wireless terminal serving as a gateway.
Figure 16:
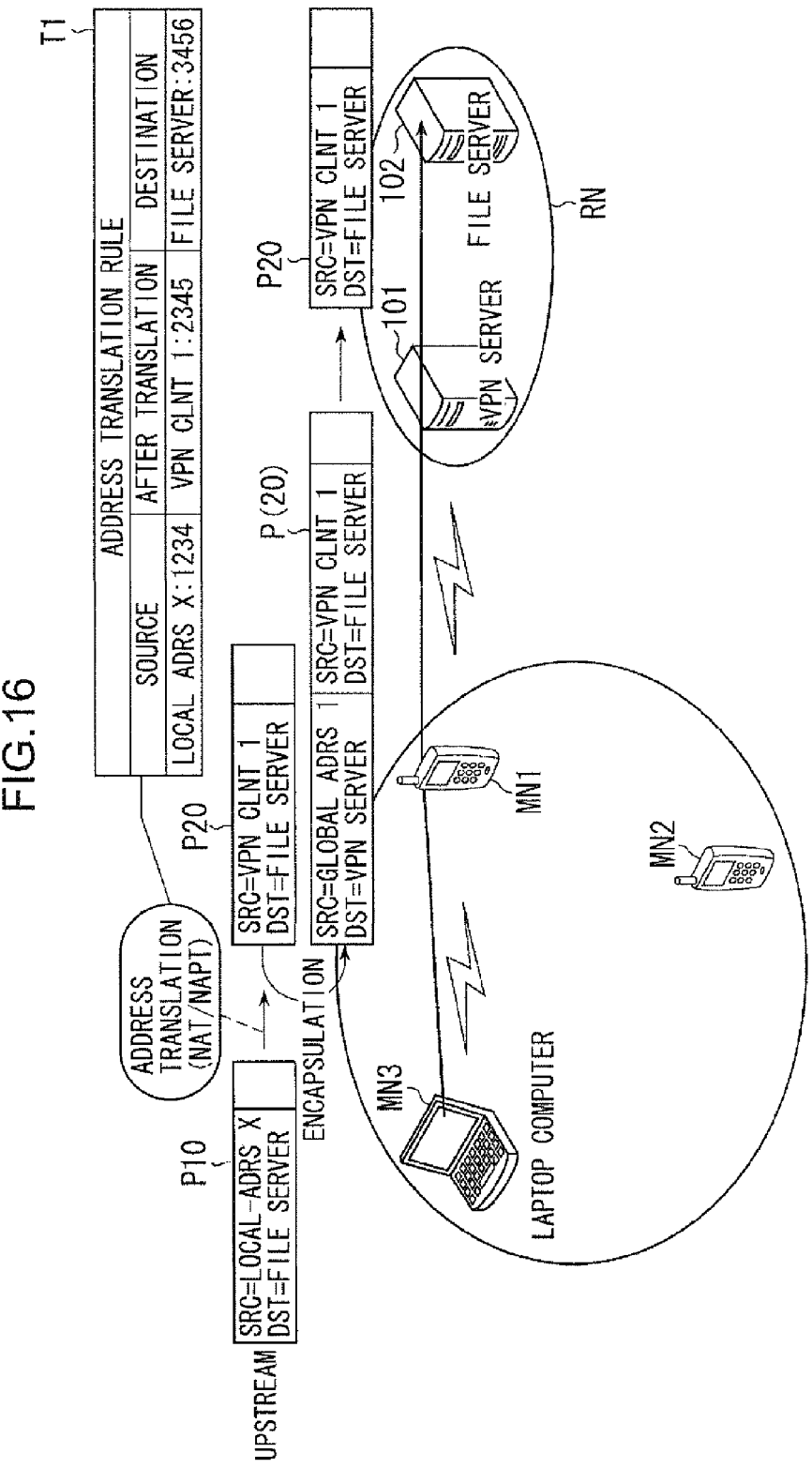
FIG. 16 shows an exemplary routing control (upstream) when integration of a plurality of routes are applied to the configuration shown in FIG. 15.
Figure 17:
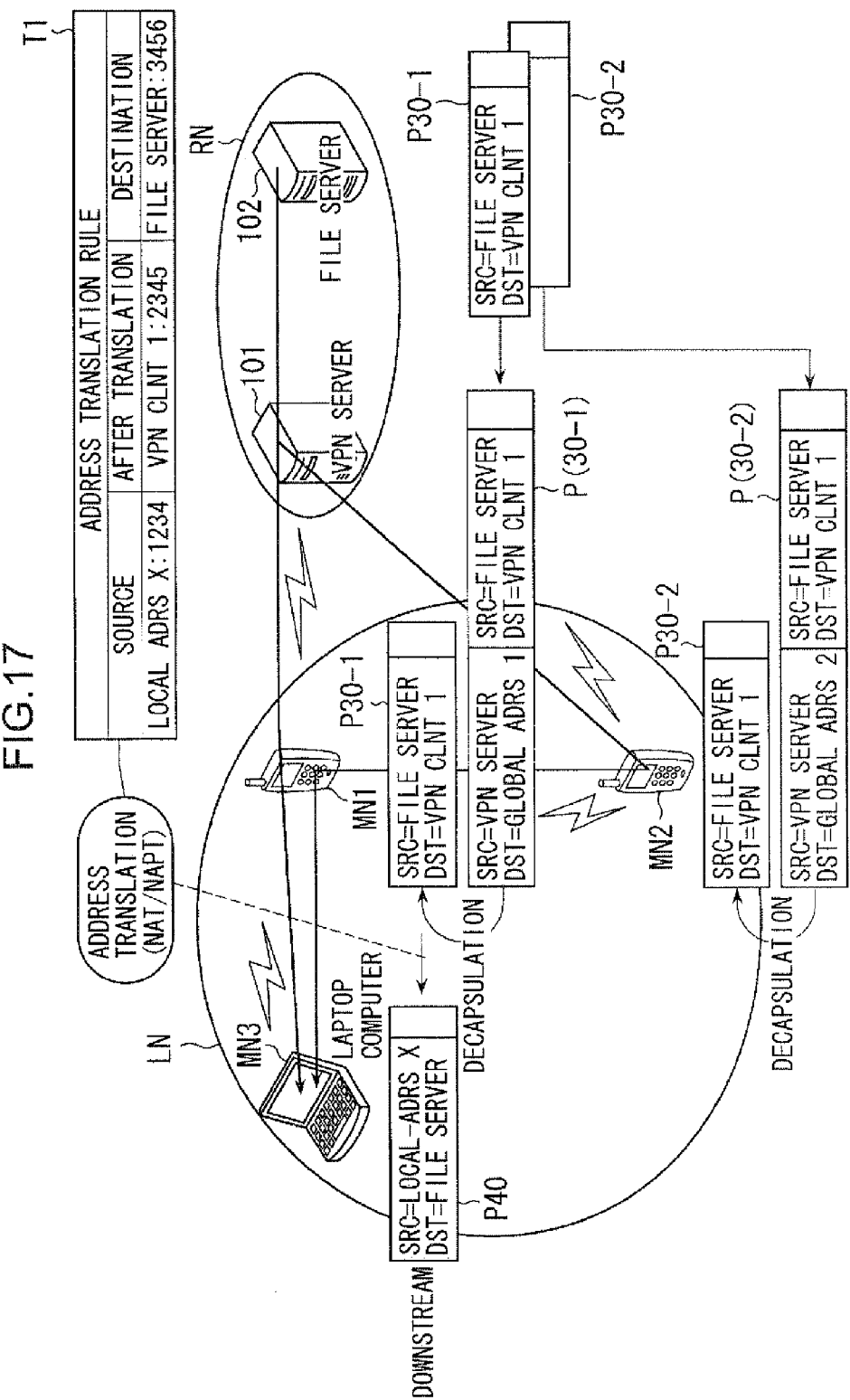
FIG. 17 shows an exemplary routing control (downstream) when integration of a plurality of routes are applied to the configuration shown in FIG. 15.

FIG. 13 is a sequence diagram between the wireless terminal MN3 and the wireless terminal MN1 serving as a default gateway. In FIG. 13, first, the wireless terminal MN3 transmits DHCPDISCOVER request to the wireless terminal MN1. The simplified DHCP server receives the request, and returns DHCPOFFER to the wireless terminal MN3.

The IP address of the wireless terminal MN3 set here is the address distributed from the VPN server 101 and stored in an address storage unit 710 (VPN clnt X), while the default gateway is a local interface IP address of the terminal (LI/F IP address 1) distributed by the VPN server 101 as well.

As explained above, according to this embodiment, two communication paths can be built for the down stream. One is a first communication path (the file server 102—the VPN server 101—the wireless terminal MN1—the wireless terminal MN3) and the other is a second communication path (the file server 102—the VPN server 101—the wireless terminal MN2—the wireless terminal MN3). Then the routes can be integrated from each terminal device (the wireless terminals MN1 and MN2) to a specific terminal device.

Therefore, virtually increasing the communication paths distributes the load for packet transfer across a plurality of routes, and enables faster packet transfer. For example, when the number of N−1 wireless terminals 2 exist in a local network LN, assuming that packets are equally distributed, the number of N communication paths are set (the first communication path is one, and the second communication path is N−1). Therefore, the CPU load of the wireless terminals MN1 and MN2 will be 1/N respectively compared with the method shown in the conventional technology. The usage rate R of the wireless resource within the local network LN is obtained by the equation below (1).

$$R=N/\{1+2\times(N-1)\} \quad (1)$$

This reduces the load on the wireless terminal MN1 serving as a gateway, and the redundant use of wireless resources can be avoided.

Moreover, the need for Network Address Translation (NAT) function is eliminated, thereby producing a versatile packet routing control system and providing the wireless terminals MN1 and MN2 with lower prices. These advantages make a packet routing control system easier to introduce, and improve the penetration rate.

Although, the above mentioned embodiment uses the wireless terminals from MN1 to MN3, a configuration employing a wired network may be allowed instead.

The packet routing control method explained in this embodiment is realized by executing a prepared program by a computer including a personal computer, a work station, and a portable terminal. This program is stored in computer readable media which include a hard disk, a flexible disk, a compact disk read-only-memory (CD-ROM), a magnet optical disk (MO), and a digital video disk (DVD). Such program is executed by being read by a computer. This program may be transmission media distributable through a network such as the Internet.

The wireless terminal MN1 and the VPN server 101 explained in this embodiment may be realized by an integrated circuit (IC) for a specific application (hereunder, simply called as "ASIC") such as a standard cell, a structured Application Specific Integrated Circuit (ASIC), or a custom LSI such as Programmable Logic Device (PLD) including FPGA. More specifically, for example, an applicable process among the above mentioned packet routing control methods can be realized by defining functions by HDL description, synthesizing the logic of the description, and providing them to custom LSI such as ASIC or PLD.

What is claimed is:

1. A packet routing control method, comprising:
a first terminal device, which has a first interface for a local network and a second interface connectable to a remote network, requiring a Virtual Private Network (VPN) address of a second terminal device which has an interface for the local network to a VPN server in the remote network;

the VPN server, which manages an Internet Protocol (IP) address group for the local network, assigning an IP address of the first terminal device for the local network, a VPN address of the second terminal device, and an IP address of at least one other terminal device which has a first interface and a second interfaces, for the local network, sending the IP address of the first terminal device and the VPN address of the second terminal device to the first terminal device, sending the IP address of the at least one other terminal device to the at least one other terminal device, and associating the VPN address of the second terminal device with an IP address assigned to the second interface of the first terminal device;

the first terminal device receiving the VPN address of the second terminal device and providing the VPN address of the second terminal device to the second terminal device to assign the VPN address of the second terminal device to the interface for the local network of the second terminal device, and associating the VPN address of the second terminal device and the first interface of the first terminal device;

the first terminal device receiving a first packet whose source address is the VPN address of the second terminal device and whose destination address is a third terminal device in the remote network, encapsulating the first packet by applying a first header that includes a global address of the VPN server as destination address without Network Address Translation (NAT), and sending the encapsulated first packet to the VPN server according to the destination address of the first header, the VPN server receiving and decapsulating the encapsulated first packets, transferring the decapsulated first packet to the third terminal device, the VPN server receiving a second packet and judging whether or not a destination address of the second packet is the VPN address of the second terminal device, when it is judged that the destination address of the second packet is the VPN address of the second terminal device, encapsulating the second packet by applying a second header whose destination addresses are global addresses of the first terminal device which is associated with the VPN address and the other terminal device, and sending the encapsulated second packet to the first terminal device and the other terminal device according to the destination address of the second header;

the first terminal device receiving and decapsulating the encapsulated second packet, and transmitting the decapsulated second packet to the second terminal device according to the VPN address through the first interface which is associated with the VPN address; and the other terminal device receiving and decapsulating the encapsulated second packet, and transmitting the decapsulated second packet to the second terminal device according to the VPN address through the first interface of the other terminal device, which is associated with the VPN address.

2. The packet routing control method according to claim 1 further comprising:

the VPN server assigning an unused IP address as a VPN address of the second terminal device, wherein the unused IP address is assigned from the IP address group on a same subnet as that of the VPN addresses assigned to the first terminal devices; and the terminal device receiving the VPN address of the second terminal device assigned at the VPN server assigning.

3. The packet routing control method according to claim 1 further comprising:

the first terminal device receiving an IP address associated with the first interface of the first terminal from the VPN server; and the first terminal device providing the IP address for the first interface of the first terminal to the second terminal device as an IP address for a default gateway of the second terminal device.

4. A packet routing control system, comprising:

a first terminal device including a first interface for a local network and a second interface connectable to a remote network, the first terminal device being configured to:

perform a first procedure including:
receiving a Virtual Private Network (VPN) address
providing the VPN address for a second terminal device to assign the VPN address to an interface for a local network of the second terminal device, and associating the VPN address with a first interface;

perform a second procedure including:
receiving a first packet whose source address is a VPN address of the second terminal device and whose destination address is a third terminal device in a remote network,
encapsulating the first packet by applying a first header that includes a VPN server, which manages an Internet Protocol (IP) address group for the local network, as destination address without Network Address Translation (NAT), and sending the encapsulated first packet to the VPN server according to the destination address of the first header; and the VPN server configured to:
perform a third procedure including:
assigning an IP address of the first terminal device for the local network, the VPN address of the second terminal device, and an IP address of at least one other terminal device which has first and second interfaces, for the local network,
sending the IP address of the first terminal device and the VPN address of the second terminal device to the first terminal device,
sending the IP address of the other terminal device to the other terminal device, and
associating the VPN address of the second terminal device with an IP address assigned to the second interface of the first terminal device;

perform a fourth procedure including:
receiving and decapsulating the encapsulated first packet, and
transferring the decapsulated first packet to the third terminal device;

judge whether or not a destination address of a second packet is the VPN address of the second terminal device;

encapsulate the second packet by applying a second header whose destination addresses are global addresses of the first terminal device which is associated with the VPN address and the other terminal device when it is judged that the destination address of the second packet is the VPN address of the second terminal device;

send the encapsulated second packet to the first terminal device and the other terminal device according to the destination addresses of the second header;

wherein the first terminal device receives and decapsulates the encapsulated second packet, and transmits the decapsulated second packet to the second terminal device according to the VPN address through the first interface which is associated with the VPN address, and the other terminal device receives and decapsulates the encapsulated second packet, and transmits the decapsulated second packet to the second terminal device according to the VPN address through the first interface of the other terminal device, which is associated with the VPN address.

5. The packet routing control system according to claim 4, wherein the VPN server assigns an unused IP address as a VPN address of the second terminal device, wherein the unused IP address is assigned from the IP address group on a same subnet as that of the VPN addresses assigned to the first and other terminal devices; and the first terminal device receives the VPN address of the second terminal device.

6. The packet routing control system according to claim 4, wherein the first terminal device receives an IP address associated with the first interface for the local network of the first terminal device from the VPN server; and the first terminal device provides the IP address associated with the first interface for the local network to the second terminal device as an IP address for a default gateway of the second terminal device.

* * * * *

UNITED STATES PATENT AND TRADEMARK OFFICE
CERTIFICATE OF CORRECTION

| | |
|---|---|
| PATENT NO. | : 8,432,877 B2 |
| APPLICATION NO. | : 12/191513 |
| DATED | : April 30, 2013 |
| INVENTOR(S) | : Nami Nagata |

It is certified that error appears in the above-identified patent and that said Letters Patent is hereby corrected as shown below:

In the Claims:

Col. 14, line 43, delete "a second interfaces" and insert --a second interface--.

Signed and Sealed this
Twenty-eighth Day of January, 2014

Michelle K. Lee
*Deputy Director of the United States Patent and Trademark Office*